United States Patent
Lee et al.

(10) Patent No.: US 8,842,224 B2
(45) Date of Patent: Sep. 23, 2014

(54) IMAGE SIGNAL PROCESSING APPARATUS FOR DETACHING A PLURALITY OF MODULES AND CONTROL METHOD THEREOF

(75) Inventors: Sim-Hong Lee, Gumi (KR); Min-Chul Kim, Gumi (KR); Myoung Hwa Ko, Gumi (KR); Hee Tae Yoo, Gumi (KR); Hong Ki Kim, Gumi (KR); Su-Zin Lee, Gumi (KR); Jae Hyun Park, Gumi (KR)

(73) Assignee: LG Electronics Inc., Seoul (KR)

( * ) Notice: Subject to any disclaimer, the term of this patent is extended or adjusted under 35 U.S.C. 154(b) by 299 days.

(21) Appl. No.: 12/447,579

(22) PCT Filed: Nov. 30, 2007

(86) PCT No.: PCT/KR2007/006121
§ 371 (c)(1),
(2), (4) Date: Nov. 5, 2009

(87) PCT Pub. No.: WO2008/084919
PCT Pub. Date: Jul. 17, 2008

(65) Prior Publication Data
US 2011/0128437 A1 Jun. 2, 2011

(30) Foreign Application Priority Data

Jan. 10, 2007 (KR) .................... 10-2007-0002880

(51) Int. Cl.
*H04N 7/26* (2006.01)
*H04N 21/443* (2011.01)
*H04N 5/44* (2011.01)
*H04N 5/775* (2006.01)
*H04N 21/4363* (2011.01)
*H04N 21/436* (2011.01)
*H04N 5/85* (2006.01)
*H04N 5/63* (2006.01)

(52) U.S. Cl.
CPC ............ *H04N 5/44* (2013.01); *H04N 21/4436* (2013.01); *H04N 5/775* (2013.01); *H04N 21/43637* (2013.01); *H04N 5/85* (2013.01); *H04N 5/63* (2013.01); *H04N 21/436* (2013.01)

USPC .......................... 348/725; 348/441; 348/563

(58) Field of Classification Search
CPC ............ H04N 21/418; H04N 21/4183; H04N 21/4184
USPC .......................................... 348/441, 563, 725
See application file for complete search history.

(56) References Cited

U.S. PATENT DOCUMENTS 5,809,337 A * 9/1998 Hannah et al. .................. 710/33
6,018,775 A * 1/2000 Vossler ............................ 710/1

(Continued)

FOREIGN PATENT DOCUMENTS

| CN | 2372847 Y | 4/2000 |
| EP | 1096372 | 5/2001 |

(Continued)

OTHER PUBLICATIONS

European Search Report dated Dec. 23, 2010 issued in Application No. 07 83 4403.

(Continued)

*Primary Examiner* — Sath V Perungavoor
*Assistant Examiner* — Jeffery Williams
(74) *Attorney, Agent, or Firm* — Ked & Associates, LLP

(57) ABSTRACT

Provided are an image signal processing apparatus and a controlling method thereof. The image signal processing apparatus includes a signal decoder, an image signal processor, a display, a controller, a memory, and a power interface. The signal decoder decodes input signals, and the image signal processor processes signals decoded by the signal decoder so that they are outputable. The display outputs the signals processed by the image signal processor, and the controller allows a list of modules recognized by the connector to be displayed, and controls driving of the module selected by a user. The memory stores a program transmitted from the selected module, and the power interface supplies power to the module.

24 Claims, 5 Drawing Sheets

(56) References Cited

U.S. PATENT DOCUMENTS

| | | | |
|---|---|---|---|
| 6,973,274 B2* | 12/2005 | Kanamoto et al. | 399/20 |
| 7,069,347 B1* | 6/2006 | Kolokowsky | 710/8 |
| 2001/0016887 A1 | 8/2001 | Toombs et al. | 701/102 |
| 2005/0088201 A1 | 4/2005 | Devlin et al. | 326/38 |
| 2005/0105007 A1 | 5/2005 | Christian | |
| 2006/0044926 A1* | 3/2006 | Mylly | 365/232 |
| 2006/0216973 A1 | 9/2006 | Walmsley et al. | |
| 2006/0227197 A1 | 10/2006 | Silverbrook et al. | |
| 2007/0270981 A1* | 11/2007 | Maruyama | 700/20 |

FOREIGN PATENT DOCUMENTS

| | | |
|---|---|---|
| EP | 1473630 | 11/2004 |
| JP | 09-006479 | 1/1997 |
| JP | H 11-220679 | 8/1999 |
| JP | 2001-177751 | 6/2001 |
| JP | 2001-285751 | 10/2001 |
| WO | WO 00/62163 A1 | 10/2000 |
| WO | WO 2006-051642 | 5/2006 |
| WO | WO 2006/051642 A1 | 5/2006 |

OTHER PUBLICATIONS

International Search Report dated Feb. 26, 2008.
Chinese Office Action dated Jun. 14, 2011 issued in Application No. 200780047827.6.
European Office Action dated Sep. 26, 2011 issued in Application No. 07 834 403.3.
European Search Report dated Apr. 21, 2011.
Korean Office Action dated Apr. 9, 2013.
European Patent Specification issued in related Patent No. EP 2 103 112 B1, dated Jun. 19, 2013.

\* cited by examiner

IMAGE SIGNAL PROCESSING APPARATUS FOR DETACHING A PLURALITY OF MODULES AND CONTROL METHOD THEREOF

TECHNICAL FIELD

The present invention relates to an image signal processing apparatus and a control method thereof. More particularly, the present invention relates to an image signal processing apparatus and a control method thereof, wherein a plurality of modules that have separate functions, respectively, and can be attached/detached to/from the image signal processing apparatus are connected to the image signal processing apparatus, so that the functions of the modules are realized through the image signal processing apparatus or the modules are controlled through the image signal processing apparatus.

BACKGROUND ART

Recently, a high quality image signal processing apparatus such as a digital television (TV) not only provides a TV broadcasting function, but also provides a function of allowing data stored in a universal serial bus (USB) memory to be viewed through a high quality TV by connecting the USB memory to the high quality image signal processing apparatus, provides a digital video recorder function of recording TV broadcasting, and provides a digital versatile disc (DVD) player function, and a Divx player function.

Though a digital TV having a variety of built-in additional functions therein is brought to the market, necessary additional functions are different depending on a user's taste. Therefore, a digital TV or a high quality image signal processing apparatus having built-in additional functions therein is not sufficient to meet the tastes of various users.

Therefore, it is required to provide an image signal processing apparatus that can selectively mount a module having an additional function and provide wide compatibility between modules having additional functions, respectively.

SUMMARY OF THE INVENTION

Accordingly, the present invention is directed to an image signal processing apparatus and a control method thereof that substantially obviate one or more problems due to limitations and disadvantages of the related art.

Embodiments of the present invention provides a module type image signal processing apparatus that can selectively add an additional function to the image signal processing apparatus depending on a user's need.

Embodiments of the present invention provides a module type image signal processing apparatus that can output an image and a voice using the image signal processing apparatus by only physically coupling a module to the image signal processing apparatus without installation of a separate control program or a converting unit.

In one aspect of the present invention, there is provided an image signal processing system including: at least one module for providing image signals; and an image signal processing apparatus including a connector that has a plurality of module interfaces for receiving the module to recognize module data of the module and control the module to be driven according to a user's selection.

In another aspect of the present invention, there is provided an image signal processing apparatus including: a module interface connectable to a module; a transceiver for converting signals transmitted/received to/from the module interface into signals having a predetermined format; a signal decoder for decoding the signals received from the transceiver an image signal processor for processing the signals decoded by the signal decoder; a display for outputting the signals processed by the signal processor; a power supply for supplying power to the module; a power interface via which the power from the power supply is supplied to the module; and a controller for controlling communication between devices.

In further another aspect of the present invention, there is provided a module including: a media interface to which an external media is connected; a media controller for converting signals received from the media interface into signals having a predetermined format; a decoder for decoding the signals output from the media controller; a transceiver for converting the decoded signals into signals having a predetermined format; a module interface for outputting the signals converted by the transceiver a module controller for controlling communication between devices; and a memory for storing a module program.

In still further another aspect of the present invention, there is provided a module including: a module interface for receiving signals from an image signal processing apparatus; a transceiver for converting signals transmitted/received to/from the module interface into signals having a predetermined format; an encoder for encoding the signals converted by the transceiver; a storage for storing the signals encoded by the encoder; a decoder for decoding the signals stored in the storage and delivering the decoded signals to the transceiver; a power interface through which power is received from the image signal processing apparatus; a module controller for controlling communication between devices; and a memory for storing a module driving program.

In yet another aspect of the present invention, there is provided a radio module system including: a first module block having: a module interface for transmitting/receiving signals to/from an image signal processing apparatus; a power interface for receiving power from the image signal processing apparatus a transceiver for converting signals transmitted/received to/from the module interface into signals having a predetermined format; a first radio transmitter/receiver for transmitting/receiving signals from the transceiver; and a first transmission/reception controller for controlling signal transmission/reception of the first radio transmitter/receiver; and a second module block including: a second radio transmitter/receiver for communicating with the first wireless transmitter/receiver wirelessly; a second transmission/reception controller for controlling signal transmission/reception of the second radio transmitter/receiver; a transceiver for converting signals from the second radio transmitter/receiver into signals having a predetermined format a module interface for delivering signals transmitted/received to/from the transceiver to an external module; and a power interface for supplying power to the external module.

In yet further another aspect of the present invention, there is provided a method for processing image signals, the method including: detecting, at an image signal processing apparatus, connection of a module; recognizing the module; executing a module driving program selected by a user; and displaying a menu for controlling the recognized module.

In still yet further another aspect of the present invention, there is provided a method for processing image signals, the method including: receiving a module selection signal from a user; checking whether there exists a connected module; displaying a list of the connected module; and executing a module driving program selected by a user.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings.

Figure 1:
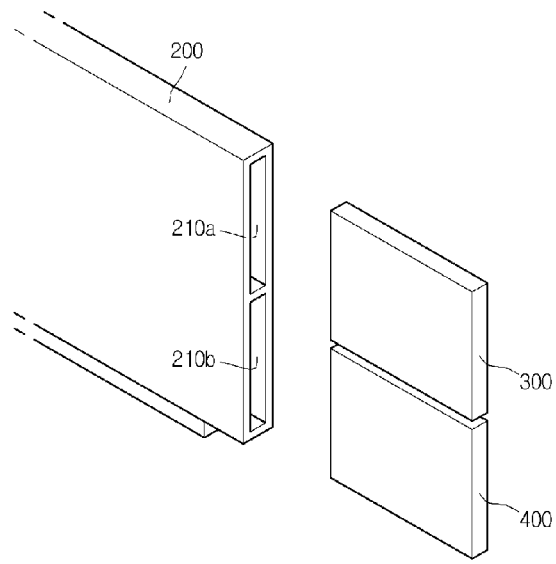
FIG. 1 is a schematic view of an image signal processing system according to an embodiment of the present invention

FIG. 1 is a schematic view of an image signal processing system according to an embodiment of the present invention.

In the image signal processing system, an image signal processing apparatus 200 can receive and output voice and image signals, and includes a plurality of connectors 210a and 210b to which a plurality of modules 300 and 400 can be connected.

The modules 300 and 400 can be devices for performing a predetermined function, such as reproducing devices for reproducing a predetermined file format, decoders for decoding predetermined files, storage devices for converting arbitrary audio/video (AV) data into data having a predetermined format and storing the converted data, and interface devices for providing an radio interface with other module.

The modules 300 and 400 can be arbitrarily connected to one of the plurality of connectors 210a and 210b.

In the case where the modules 300 and 400 are reproducing devices, the reproducing devices can be MP3 players, an electronic picture frame (EPF), and digital versatile disc (DVD) players. In the case where the modules 300 and 400 are storage devices, the modules 300 and 400 can replaces functions of hard disk drives (HDDs), digital video recorders (DVRs).

For example, the modules 300 and 400 can include digital television (TV) tuners and digital TV decoders. At this point, in the case of an analog TV or a monitor where a digital TV tuner or a decoder is not mounted in the image signal processing apparatus 200, the analog TV or the monitor can receive digital TV broadcasting by mounting the modules 300 and 400 in it.

Also, in the case where the modules 300 and 400 are interface devices for providing an interface with other module, they include a radio transmitter/receiver to connect the image signal processing apparatus with other module wirelessly. Also, the modules 300 and 400 can be interface devices for interfacing other devices that cannot be connected to the connectors 210a and 210b of the image signal processing apparatus 200 with the image signal processing apparatus 200.

The modules 300 and 400 use protocols that can be compatible with each other. The module 300 or 400 can be arbitrarily connected to one of the plurality of connectors 210a and 210b to communicate with the image signal processing apparatus 200 and perform a corresponding function.

For example, the modules 300 and 400 can communicate with the image signal processing apparatus 200 using a High Definition Multimedia Interface (HDMI) standard, and output image or voice data through the image signal processing apparatus 200, or provide an interface with the image processing apparatus 200 to other device.

The connectors 210a and 210b can include an HDMI interface for transmitting and receiving reproduction signals and control signals for the modules 300 and 400, respectively, and include a power interface for supplying power (refer to FIGS. 2, 3, 4, and 5).

Figure 2:
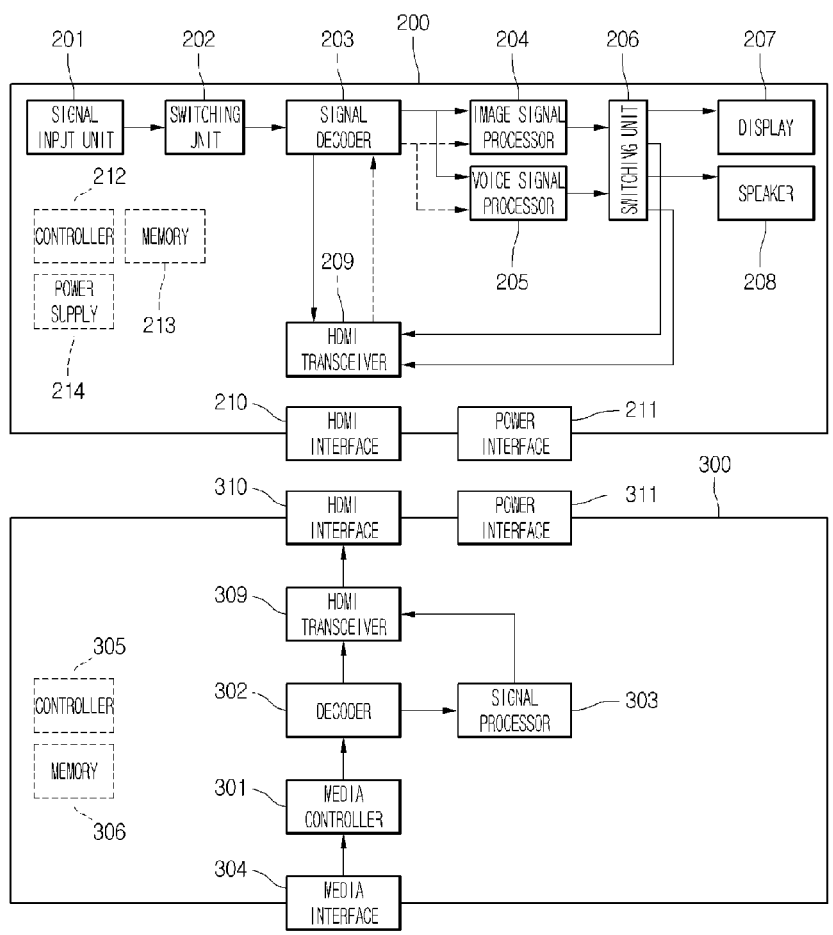
FIG. 2 is a block diagram of an image signal processing system according to an embodiment of the present invention

FIG. 2 is a block diagram of an image signal processing system including the image signal processing apparatus 200 and the module 300 connected thereto according to an embodiment of the present invention.

The image signal processing apparatus 200 includes: a signal decoder 203 for decoding digital broadcasting signals or external input signals; an image signal processor 204 for converting image signals of the decoded signals so that they are appropriately output via a display 207 through processing such as scaling change or brightness change; a voice signal processor 205 for converting voice signal of the decoded signals so that they are appropriately output via a speaker 208; and the display 207 and the speaker 208 for outputting signals converted by the image signal processor 204 and the voice signal processor 205.

Also, the image signal processing apparatus 200 can include a controller 212 for controlling communication and operations of the above elements, and a memory 213 for storing data required upon the operations of the above elements.

Also, the image signal processing apparatus 200 includes a transceiver for converting control signals and reproduction signals for the module 300, e.g., an HDMI transceiver 209, an HDMI interface 210 for connecting the HDMI transceiver 209 with the module 300, a power supply 213 for supplying power to the module 300 in response to a control of the controller 212, and a power interface 311 for delivering power supplied from the power supply 213 to the module 300.

The HDMI interface 210 includes a transmission/reception part for reproduction data signals or menu screen data signals, and a control signal transmission/reception part as a module interface.

Reproduction data signals or menu screen data signals are signals output via the display 207, and the control signals are signals related to operation control of the module 300.

The transmission/reception part for the reproduction data signals or menu screen data signals can communicate using transport stream (TS), composite video banking sync/sound intermediate frequency (CVBS/SIF), BT656, Sony/Philips Digital Interface (SPDIF), or I2S standard besides HDMI standard. Also, the control signal transmission/reception part can be Universal Asynchronous Receiver/Transmitter (UART) or General Purpose Input/Output (GPIO).

The controller 212 of the image signal processing apparatus 200 controls the power supply 213 on the basis of recognition data of the module 300 stored in the memory 306 within the module 300 to rated voltage and current suitable for the module 300.

Also, the image signal processing apparatus 200 can further include a signal input unit 201 for receiving digital broadcasting signals or external input signals and delivering the same to the signal decoder 203. The signal input unit 201 can be a tuner for receiving digital broadcasting signals or a connector for receiving signals from an external apparatus such as a DVD player.

Also, the image signal processing apparatus 200 can further include a switching unit 202 for selecting signals to be decoded from signals received via the signal input unit 201 or the HDMI transceiver 209, and delivering the selected signals to the signal decoder 203.

Also, the image signal processing apparatus 200 can further include a switching unit 206 for selecting whether to signals converted by the image signal processor 204 and the voice signal processor 205 to the display 207 and the speaker 208, or to the transceiver 209.

First Embodiment

FIG. 2 is a block diagram of an image signal processing system including the image signal processing apparatus 200 and the module 300 connected thereto according to an embodiment of the present invention.

The image signal processing apparatus 200 includes: a signal decoder 203 for decoding digital broadcasting signals or external input signals; an image signal processor 204 for converting image signals of the decoded signals so that they are appropriately output via a display 207 through processing such as scaling change or brightness change; a voice signal processor 205 for converting voice signal of the decoded signals so that they are appropriately output via a speaker 208; and the display 207 and the speaker 208 for outputting signals converted by the image signal processor 204 and the voice signal processor 205.

Also, the image signal processing apparatus 200 can include a controller 212 for controlling communication and operations of the above elements, and a memory 213 for storing data required upon the operations of the above elements.

Also, the image signal processing apparatus 200 includes a transceiver for converting control signals and reproduction signals for the module 300, e.g., an HDMI transceiver 209, an HDMI interface 210 for connecting the HDMI transceiver 209 with the module 300, a power supply 213 for supplying power to the module 300 in response to a control of the controller 212, and a power interface 311 for delivering power supplied from the power supply 213 to the module 300.

The HDMI interface 210 includes a transmission/reception part for reproduction data signals or menu screen data signals, and a control signal transmission/reception part as a module interface.

Reproduction data signals or menu screen data signals are signals output via the display 207, and the control signals are signals related to operation control of the module 300.

The transmission/reception part for the reproduction data signals or menu screen data signals can communicate using TS, CVBS/SIF, BT656, SPDIF, or I2S standard besides HDMI standard. Also, the control signal transmission/reception part can be Universal Asynchronous Receiver/Transmitter (UART) or General Purpose Input/Output (GPIO).

The controller 212 of the image signal processing apparatus 200 controls the power supply 213 on the basis of recognition data of the module 300 stored in the memory 306 within the module 300 to rated voltage and current suitable for the module 300.

Also, the image signal processing apparatus 200 can further include a signal input unit 201 for receiving digital broadcasting signals or external input signals and delivering the same to the signal decoder 203. The signal input unit 201 can be a tuner for receiving digital broadcasting signals or a connector for receiving signals from an external apparatus such as a DVD player.

Also, the image signal processing apparatus 200 can further include a switching unit 202 for selecting signals to be decoded from signals received via the signal input unit 201 or the HDMI transceiver 209, and delivering the selected signals to the signal decoder 203.

Also, the image signal processing apparatus 200 can further include a switching unit 206 for selecting whether to signals converted by the image signal processor 204 and the voice signal processor 205 to the display 207 and the speaker 208, or to the transceiver 209.

The module 300 can be a device including media data and reproducing the media data, such as video cassette recorders (VCRs), DVD players, memory card readers, and USB readers. The module 300 includes: a media interface 304 to which an external connector is connected; a media controller 301 for converting signals received from the media interface 304 into signals having a predetermined format; a decoder 302 for decoding signals output from the media controller 301; a transceiver 309 for converting the decoded signals into signals having a format suitable for HDMI standard; an HDMI interface 310 for outputting the signals converted by the transceiver 309; a module controller 305 for controlling communication between devices; and a memory 306 for storing a driving program of the module 300 and AV data to be reproduced or other data.

The module 300 can further include a signal processor 303 for controlling image values or scales of signals decoded by the decoder 302, and delivering the same to the transceiver 309.

Depending on an embodiment, recognition data of the module 300 may be stored in a register within the controller 305 of the module 300.

When connected to the image signal processing apparatus 200, the module 300 executes the driving program of the module 300 stored in the memory 306 to provide a list of AV data for reproduction stored in the memory 306 or a menu screen required for controlling the module 300 through the image signal processing apparatus 200. A user can reproduce the AV data stored in the module 300 or control the module 300 using the list of the AV data or the menu screen provided through the image signal processing apparatus 200.

At this point, the image signal processing apparatus 200 serves only as an output device for outputting AV data transferred from the module 300 via the display 207 and the speaker 208.

Depending on an embodiment, the driving program of the module 300 is not executed within the module 300, but downloaded from the memory 305 of the module 300 to the image signal processing apparatus 200, so that the controller 212 of the image signal processing apparatus 200 can execute the driving program. In this case, the image signal processing apparatus 200 receives data required for reproducing AV data or providing a control menu screen from the module 300. The image signal processing apparatus 200 decodes the AV data and processes signals thereof within the image signal processing apparatus 200 and outputs the signals via the display 207 and the speaker 208.

Referring to FIG. 2, the image signal processing apparatus 200 and the module 300 are connected to each other via the HDMI interfaces 210 and 310 for transmitting and receiving controls signals and reproduction signals, and the power interfaces 211 and 311 for supplying power. The HDMI interfaces 210 and 310, and the power interfaces 211 and 311 constitute the connectors 210a and 210b of the image processing apparatus 200 of FIG. 1.

Second Embodiment

Figure 3:
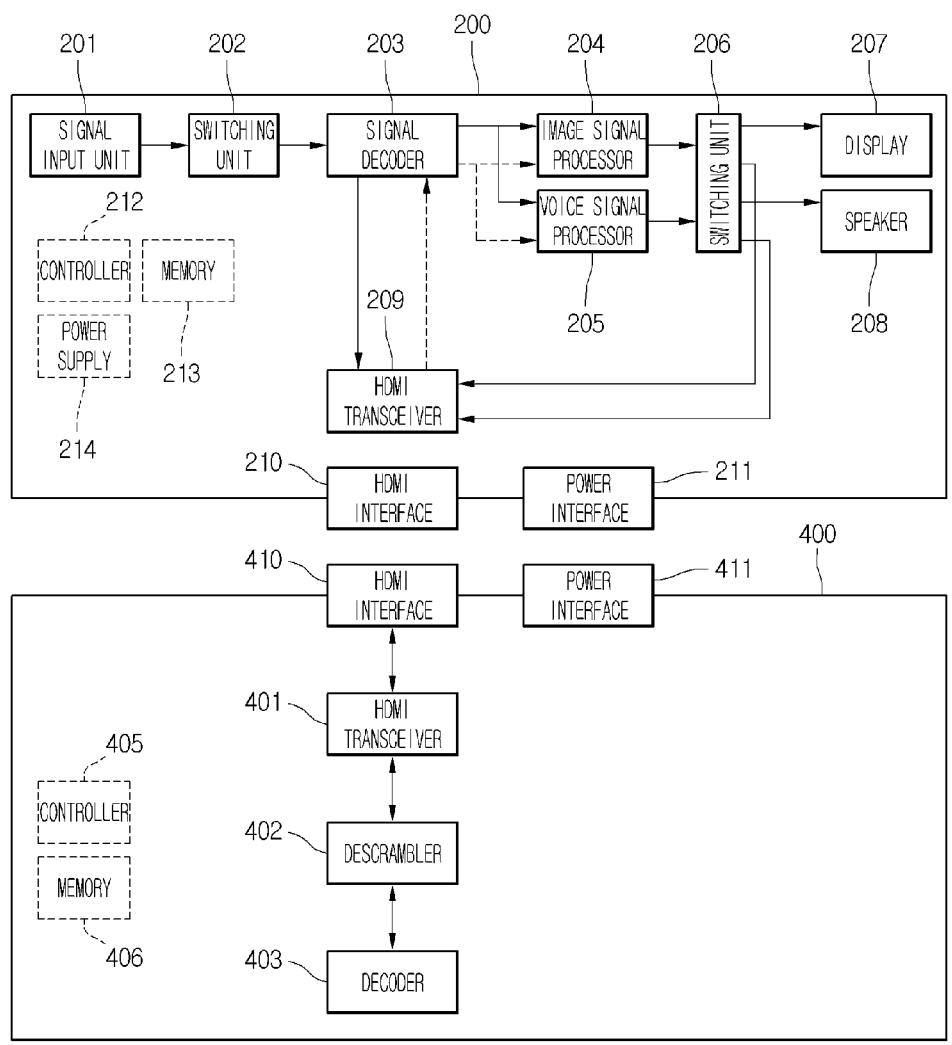
FIG. 3 is a block diagram of an image signal processing system according to another embodiment of the present invention

FIG. 3 is a block diagram of an image signal processing system including the image signal processing apparatus 200 and the module 400 connected thereto according to an embodiment of the present invention.

The image signal processing apparatus 200 can have the structure shown in FIG. 2.

The module 400 can be a module for decoding, such as color decoders, MPEG2 decoders, and MPEG4 decoders. In the case where there are data that cannot be decoded by the signal decoder 203 of the image signal processing apparatus 200, the data can be reproduced by the module 400.

The module 400 includes: an HDMI interface 410 for transmitting and receiving AV signals and control signals to and from the image signal processing apparatus 200; a transceiver 401 for converting signals transmitted and received to and from the HDMI interface 410 into signals having a predetermined format; a decoder 403 for decoding the signals converted by the transceiver 401; a power interface 411 for receiving power from the image signal processing apparatus 200; a module controller 405 for controlling communication between devices; and a memory for storing module data and a driving program of the module 400.

Depending on an embodiment, recognition data of the module 400 may be stored in a register within the controller 405 of the module 400.

As in FIG. 2, the HDMI interface 410 can transmit and receive AV signals according to TS, CVBS/SIF, BT656, SPDIF, or I2S standard besides HDMI standard, and transmit and receive control signals according to UART or GPIO.

Also, the module 400 can further include a descrambler 402 for descrambling signals converted by the transceiver 401 and delivering the descrambled signals to the decoder 403.

Figure 4:
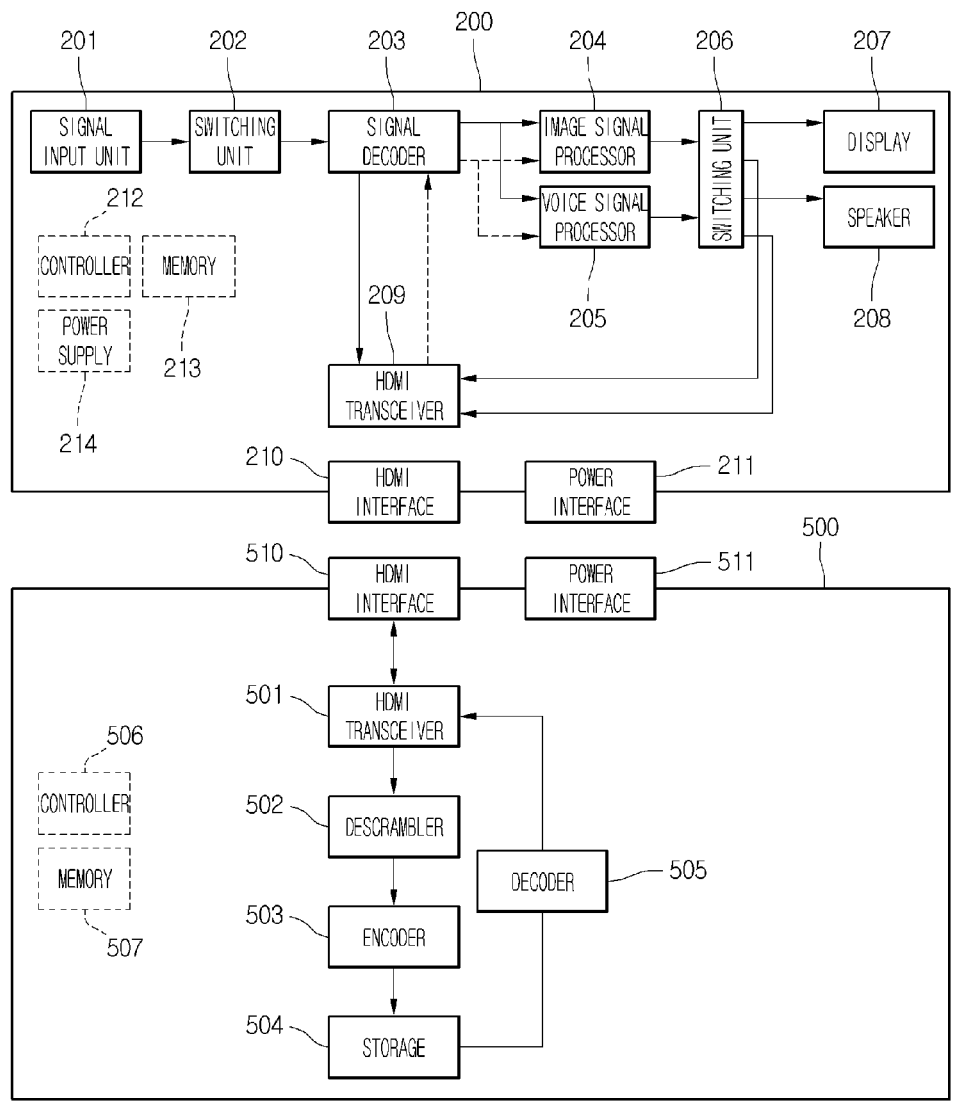
FIG. 4 is a block diagram of an image signal processing system according to yet another embodiment of the present invention.

FIG. 4 is a block diagram of an image signal processing system including the image signal processing apparatus 200 and the module 500 connected thereto according to an embodiment of the present invention.

The image signal processing apparatus 200 can have the structure shown in FIG. 2.

The module 500 can be a module for performing a storing function, such as DVR HDDs. The module 500 stores AV data received from the image signal processing apparatus 200 or outputs stored AV data via the image signal processing apparatus 200.

The module 500 includes: an HDMI interface 510 for receiving signals from the image signal processing apparatus 200; a transceiver 501 for converting signals transmitted and received to and from the HDMI interface 510 into signals having a predetermined format; an encoder 503 for encoding the signals converted by the transceiver 501; a storage 504 for storing signals encoded by the encoder 503; a decoder 505 for decoding signals stored in the storage 504 and transferring the decoded signals to the transceiver 501; a power interface 511 for receiving power from the image signal processing apparatus 200; a module controller 506 for controlling communication between the devices; and a memory 507 for storing module data and a driving program of the module 500.

The module 500 can further include a descrambler 502 for descrambling signals converted by the transceiver 501 and delivering the descrambled signals to the encoder 503.

As in FIG. 2, the HDMI interface 510 can transmit and receive AV signals according to TS, CVBS/SIF, BT656, SPDIF, or I2S standard besides HDMI standard, and transmit and receive control signals according to UART or GPIO.

Figure 5:
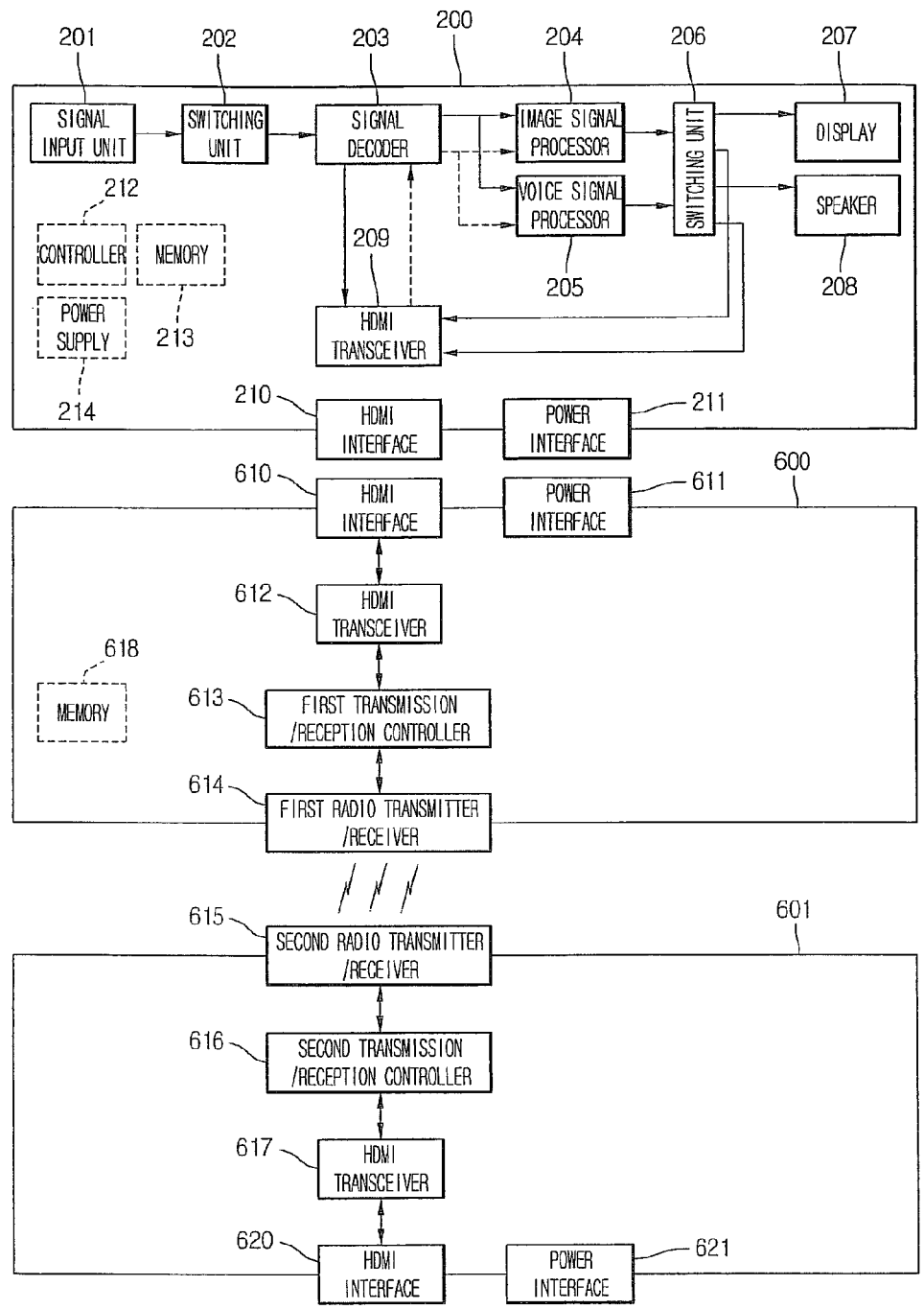
FIG. 5 is a block diagram of an image signal processing system according to still another embodiment of the present invention.

FIG. 5 is a block diagram of the image signal processing apparatus 200 and the module systems 600 and 601 connected thereto according to another embodiment of the present invention.

The image signal processing apparatus 200 can have the structure shown in FIG. 2.

The module systems 600 and 601 of FIG. 5 are modules for wirelessly connecting another module to the image signal processing apparatus 200, and include a first module unit 600 and a second module unit 601.

The first module unit 600 is connected to the image signal processing apparatus 200. The second module unit 601 transmits and receives radio data to and from the first module unit 600, and provides an HDMI interface between another module and the image signal processing apparatus 200.

That is, the second module 601 includes an interface for transmitting and receiving control signals and data signals to and from another module having no radio transmission and reception function, and allows the another module to be wirelessly connected to the image signal processing apparatus 200 and to output data or a control menu via the image signal processing apparatus 200.

The first module 600 includes: an HDMI interface 610 for transmitting and receiving signals to and from the image signal processing apparatus 200; a power interface 611 for receiving power from the image signal processing apparatus 200; a transceiver 612 for converting signals transmitted and received to and from the HDMI interface 610 into signals having a predetermined format; a first radio transmitter/receiver 614 for transmitting and receiving signals to and from the transceiver 612; and a first transmission/reception controller 613 for controlling signal transmission/reception of the first radio transmitter/receiver 614.

The first module 600 can further include a memory 618 for storing module data and a driving program of the module system.

As in FIG. 2, the HDMI interface 610 can transmit and receive AV signals according to TS, CVBS/SIF, BT656, SPDIF, or I2S standard besides HDMI standard, and transmit and receive control signals according to UART or GPIO.

The second module 601 includes: a second radio transmitter/receiver 615 for wirelessly communicating with the first radio transmitter/receiver 614; a second transmission/reception controller 616 for controlling signal transmission/reception of the second radio transmitter/receiver 615; a transceiver 617 for converting signals from the second radio transmitter/receiver 615 into signals having a predetermined format; an HDMI interface 620 for delivering signals transmitted and received to and from the transceiver 617 to an external module; and a power interface 621 for supplying power to the external module.

Figure 6:
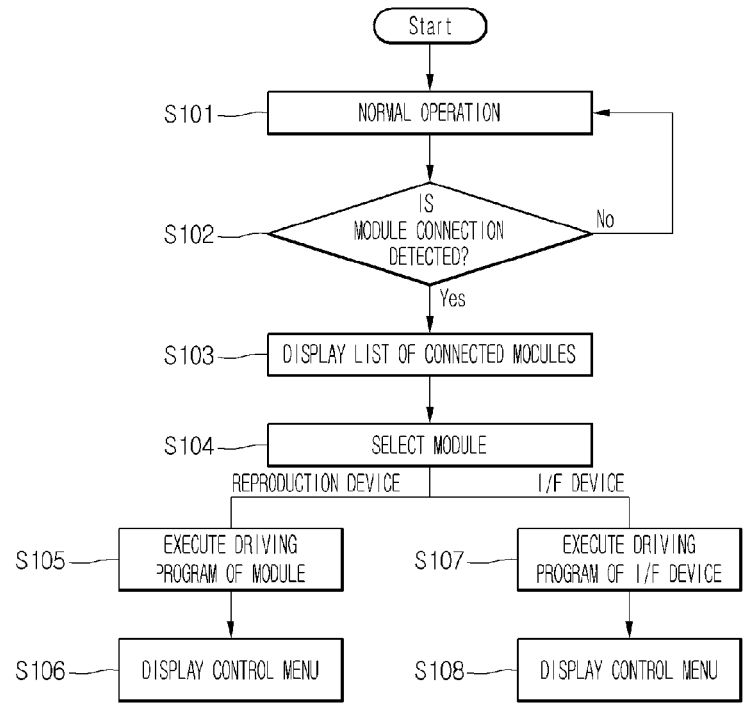
FIG. 6 is a flowchart illustrating a method of processing an image signal according to an embodiment of the present invention and FIG. 7 is a flowchart illustrating a method of processing an image signal according to another embodiment of the present invention.

FIG. 6 is a flowchart illustrating a method of processing an image signal according to an embodiment of the present invention. For description, it is assumed that a module connected to an image signal processing apparatus is the reproducing device shown in FIG. 2. The same description can be applied to the module shown in FIGS. 3, 4, and 5 or other modules.

Referring to FIGS. 2 and 6, when a new module, e.g., the module 300 for reproduction shown in FIG. 2 is connected to the HDMI interface 210 and the power interface 211 of the image signal processing apparatus 200 while the image signal processing apparatus 200 normally operates, that is, the image signal processing apparatus 200 outputs broadcasting signals through the signal input unit 201, or outputs image or voice signals reproduced by an already connected other module or an arbitrary external device (S101), the image signal processing apparatus 200 receives recognition data stored in the memory 306 of the module 300 or the register within the controller 305 to recognize the kind of the module 300.

After that, the controller 212 of the image signal processing apparatus 200 generates a list including a newly recognized module and previously recognized modules and displays the list to a user (S103). At this point, an item regarding the newly recognized module can be inverted so that it is easily recognized by the user.

When the user selects one item on the displayed list including the modules (S104) and the selected module is a device for reproduction, a driving program stored in the memory 306 of the module 300 is executed (S105) to generate a control screen for reproducing or controlling the module 300 and display the control screen through the image signal processing apparatus 200 (106).

Depending on an embodiment, the image signal processing apparatus 200 downloads and executes the driving program, and receives only data required for generating and executing the control screen from the module 300 to generate the control screen.

In the case where the module selected by the user is an interface device for providing an interface with other module, for example, an interface device for providing a function of transmitting and receiving signals to and from other module, the module has the structure shown in FIG. 5, executes a driving program for driving the modules 600 and 601 for interface (S107), generates and displays a control menu for the modules 600 and 601 for interface (S108).

After that, the modules 600 and 601 for interface are controlled through a displayed screen, and provide an interface between the image signal processing apparatus 200 and other module.

After that, when there is a driving program for another module connected to the modules 600 and 601 for interface, the driving program is executed, a control menu of the driving program can be output via the image signal processing apparatus 200, so that the control menu of the another module can be provided to a user.

Figure 7:
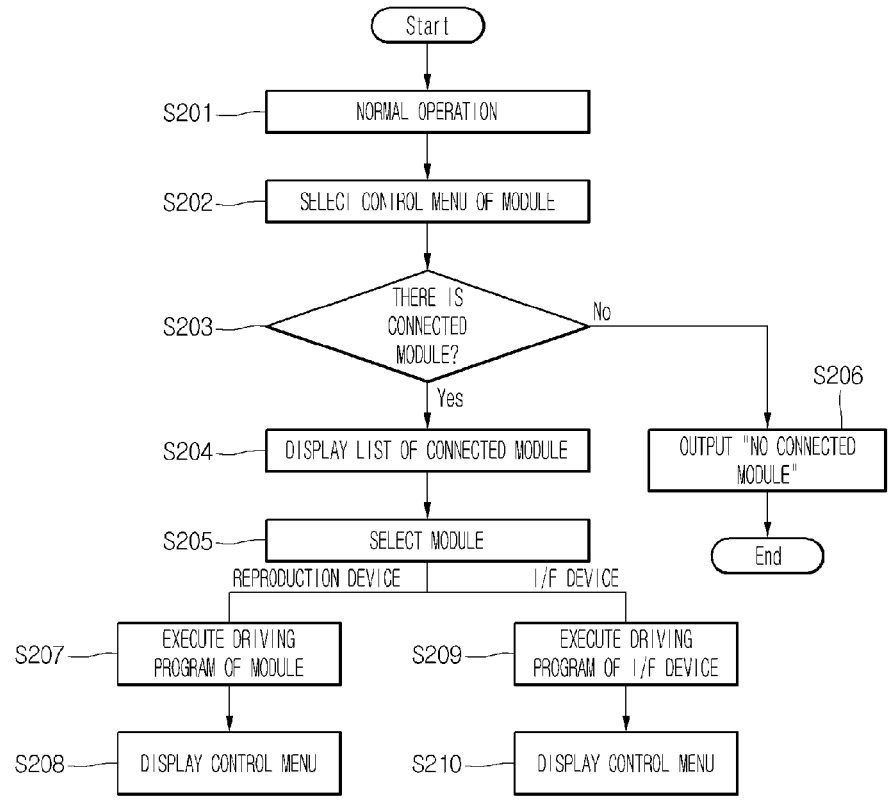

FIG. 7 is a flowchart illustrating a method of processing an image signal according to another embodiment of the present invention.

Likewise, for description, it is assumed that a module connected to an image signal processing apparatus is the reproducing device shown in FIG. 2. The same description can be applied to the module shown in FIGS. 3, 4, and 5 or other modules.

Referring to FIGS. 2 and 7, when a user selects a control menu of the module 300 in order to use a function of the module 300 (S202) while the image signal processing apparatus 200 normally operates, that is, the image signal processing apparatus 200 outputs broadcasting signals through a tuner, or outputs image or voice signals reproduced by an already connected module or an arbitrary external device (S201), whether there is a currently connected module is judged (S203). When there is no currently connected module, a message saying that there is no connected module is output (S206) and an operation is ended.

When there is the currently connected module, a list of all connected modules is generated and displayed (S204), a module desired by the user is selected through a displayed screen (S205).

In the case where the module selected by the user is a device for reproduction, a driving program stored in a memory of the module is executed (S207) to generate a control screen for reproducing or controlling the module and display the same through the image signal processing apparatus 200 (S208).

In the case where the module selected by the user is an interface device for providing an interface with other module, for example, an interface device for providing a function of transmitting and receiving signals to and from other module, the module has the structure shown in FIG. 5, executes a driving program for driving the modules 600 and 601 for interface (S209), generates and displays a control menu for the modules 600 and 601 for interface (S210).

After that, the modules 600 and 601 for interface are controlled through a displayed screen, and provide an interface between the image signal processing apparatus 200 and other module 15.

After that, when there is a driving program for another module connected to the modules 600 and 601 for interface, the driving program is executed, a control menu of the driving program can be output via the image signal processing apparatus 200, so that the control menu of the another module can be provided to a user.

It will be apparent to those skilled in the art that various modifications and variations can be made in the present invention. Thus, it is intended that the present invention covers the modifications and variations of this invention provided they come within the scope of the appended claims and their equivalents.

The invention claimed is:

1. An image signal processing system comprising:
    at least one module for providing image signals; and
    an image signal processing apparatus, the image signal processing apparatus being a television and including:
    a first connector to be coupled to a first module, and
    at least one of a circuit or software instructions to recognize data from the first module and to control the first module to be driven based on received info nation,
    wherein the at least one of the circuit or software instructions receives a recognition data stored in the first module when the first module is connected to a module interface and a power interface of the first connector while the image signal processing apparatus outputs broadcasting signals or outputs image or voice signals reproduced by an already connected second module or an external device, generates and displays a list including the newly recognized first module and the previously recognized second module, and provides a voltage suitable for the first module to the first module via the first connector based on the recognition data, the recognition data including a type of the first module,
    wherein a value of the voltage depends on the recognition data,
    wherein the recognition data of the first module is stored in a register within a controller of the first module or a memory of the first module, and
    wherein the first module controls execution of a driving program stored in the first module and controls display of a control screen for reproducing audiovisual data stored in the first module based on the executed driving program.

2. The system according to claim 1, wherein the image signal processing apparatus further comprises:
a second connector to be coupled to the second module:
a signal decoder for decoding input signals;
an image signal processor for processing signals decoded by the signal decoder; and
a display for outputting the signals processed by the image signal processor
wherein the list is generated so that items of at least one of the first or second modules in the list are inverted in the list and wherein the controller is to control driving of one of the first or second modules based on a selection signal.

3. The system according to claim 1, wherein the first module coupled to the first connector comprises:
a module interface connected to the module interface of the first connector of the image signal processing apparatus;
a transceiver for converting image signals received from the module interface into signals having a predetermined format;
a decoder for decoding the image signals received from the transceiver;
the memory for storing the driving program; and
the controller for controlling communication among the decoder, transceiver, and module interface.

4. The system according to claim 1, wherein the first module coupled to the first connector is a wireless module system comprising:
a first module section coupled to a module interface; and
a second module section to wirelessly communicate with the first module section and having a module interface for connection with a second module.

5. The system according to claim 1, wherein the module interface transmits and receives signals to and from the first module and the power interface supplies power to the first module.

6. A television comprising:
a first connector coupled to a first module, the first connector including a first module interface for transmitting and receiving signals to and from the first module and a first power interface for supplying power to the first module;
a transceiver to convert signals transmitted/received to/from the first module interface into signals having a predetermined format;
a signal decoder to decode the signals received from the transceiver;
an image signal processor to process the signals decoded by the signal decoder;
a display for outputting the signals processed by the image signal processor;
a power supply for supplying power to the first module via the first power interface; and
a controller for controlling communication with the first module,
wherein the controller is configured to
receive a recognition data stored in the first module to recognize the first module when the first module is connected to the first module interface and the first power interface while the image signal processing apparatus outputs broadcasting signals or outputs image or voice signals reproduced by an already-connected second module or an external device,
generate and display a list of modules recognized by the television based on respective recognition data of the modules, and
in response to selection of a specific module by a user in the list, execute a driving program stored in the selected module to generate a control screen for controlling the selected module and display the control screen for reproducing audiovisual data stored in the selected module,
wherein the controller is further configured to provide a voltage suitable for the first module to the first module via the first connector based on the recognition data, the recognition data including a type of the first module,
wherein a value of the voltage depends on the recognition data, and
wherein the controller is further configured so that an item of the first module is inverted in the list.

7. The television according to claim 6, further comprising a signal input receiver to receive input signals for input into the signal decoder.

8. The television according to claim 6, further comprising an input selection switch to selectively deliver signals received by the signal input receiver for input into the signal decoder.

9. A method for processing image signals in a television, the method comprising:
detecting, at the television, when a first module is connected to a connector;
receiving a recognition data stored in the first module to recognize the first module when the first module is connected to a data interface and a power interface of the connector while the television outputs broadcasting signals or outputs image or voice signals reproduced by an already-connected second module or an external device, the recognition data including a type of the first module;
generating and displaying a list including the newly recognized first module and the previously recognized second module;
providing a voltage suitable for the module to the module via the connector based on a recognition data stored in the module, wherein a value of the voltage depends on the recognition data;
generating and displaying a list of at least one module including the first module, the at least one module being recognizable to the television;
executing a driving program stored in the first module according to a selection of a user; and
generating a control screen to reproduce audiovisual data stored in the first module based on the executed driving program; and
displaying the generated control screen providing an option to select the audiovisual data to be reproduced.

10. The method according to claim 9, wherein the recognizing of the first module comprises adding an item corresponding to the first module for display on the control screen.

11. The system according to claim 1, further comprising:
a second connector to be coupled to a second module, wherein:
the first connector corresponds to a first communication standard, and
the second connector corresponds to a second communication standard different from the first communication standard.

12. The system according to claim 11, wherein the first and second communication standards are selected from the group consisting of HDMI, TS, CUBS/SIF, BT656, SPDIF, or I2S.

13. The system according to claim 11, wherein the at least one of the circuit or software instructions controls display of a list including the first module and the second module, when the first and second connectors are simultaneously coupled to respective ones of the modules.

14. The system according to claim 11, wherein the first and second connectors are removably plugged into respective ones of the modules.

15. The system according to claim 11, the image signal processing apparatus includes a housing that includes first and second recesses and wherein each recess includes a respective one of the first and second connectors.

16. The system according to claim 1, wherein the received information corresponds to a user selection signal.

17. The system according to claim 1, wherein the first module coupled to the first connector includes a device including first media data for reproducing the first media data and wherein a second module coupled to a second connector includes at least one of another device including second media data for reproducing the second media data or a data storage device.

18. The television according to claim 6, further comprising:
a second connector coupled to a second module, the second connector including a second module interface for transmitting and receiving signals to and from the second module and a second power interface for supplying a power to the second module, wherein:
the first module interface corresponds to a first communication standard, and
the second module interface corresponds to a second communication standard different from the first communication standard.

19. The television of claim 18, wherein the first and second communication standards are selected from the group consisting of HDMI, TS, CVBS/SIF, BT656, SPDIF, or I2S.

20. The television according to claim 18, wherein the controller controls display of the list of at least one module including the first module and the second module, when the first and second module interfaces are simultaneously coupled to respective ones of the modules.

21. The television according to claim 18, wherein the first and second module interfaces are removably plugged into respective ones of the modules.

22. The television according to claim 18, further comprising:
a housing having first and second recesses,
wherein each recess includes a respective one of the first and second module interfaces.

23. The television according to claim 6, wherein the module coupled to the first module interface includes a device including first media data for reproducing the first media data and wherein a module coupled to a second module interface includes at least one of another device including second media data for reproducing the second media data or a data storage device.

24. The system according to claim 1, wherein the type of the first module includes at least one of a reproducing device, a decoder, a storage device and an interface device.

* * * * *